Dec. 11, 1934.   R. H. TOWNSLEY   1,983,685
RECEPTACLE FOR FOOD PRODUCTS
Filed Nov. 10, 1932
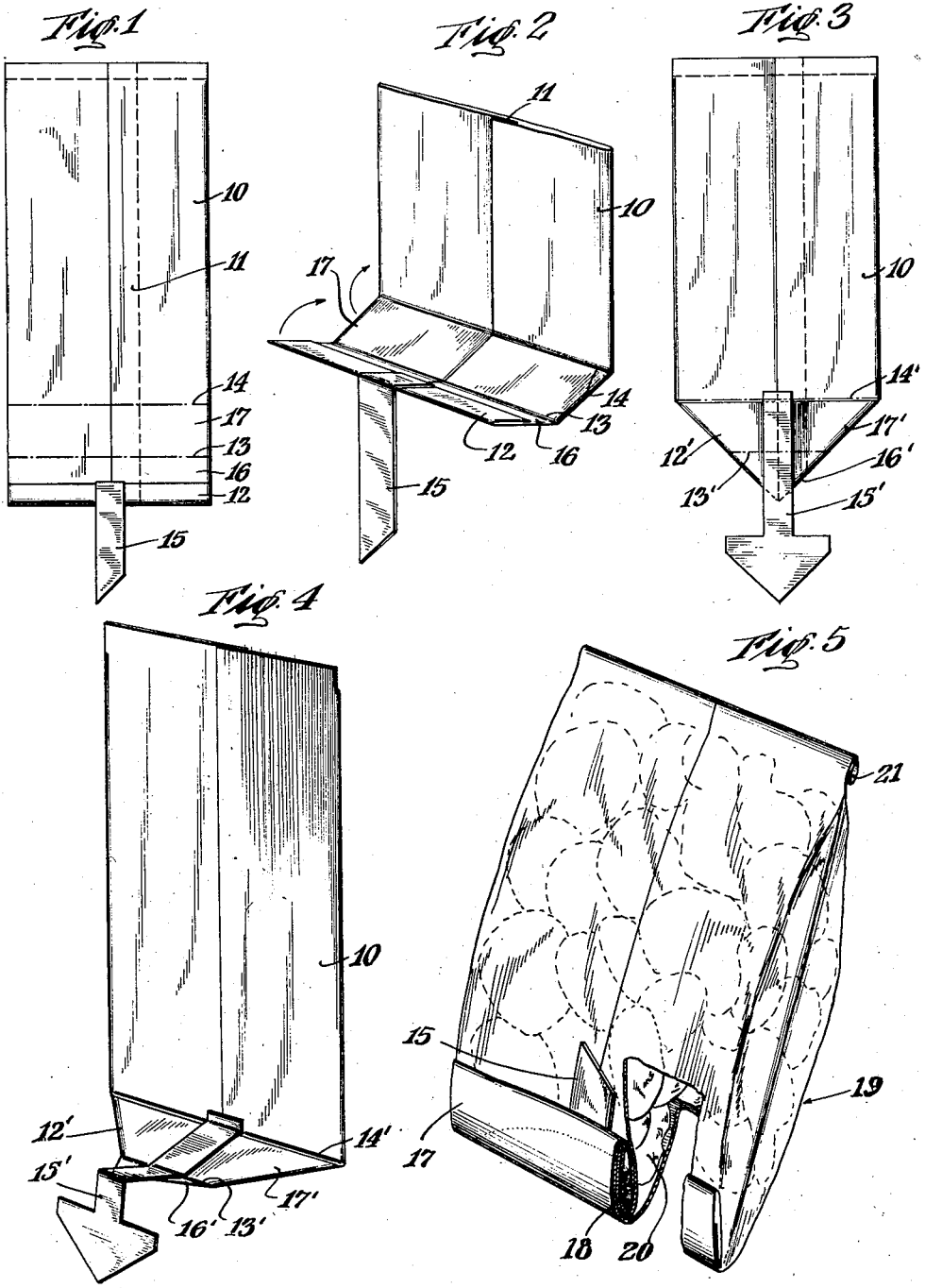

Patented Dec. 11, 1934

1,983,685

UNITED STATES PATENT OFFICE 1,983,685

RECEPTACLE FOR FOOD PRODUCTS

Robert Harold Townsley, New York, N. Y., assignor to Standard Brands Incorporated, New York, N. Y., a corporation of Delaware Application November 10, 1932, Serial No. 641,997

7 Claims. (Cl. 206—47)

This invention relates to receptacles and, more particularly, to such receptacles preferably formed from paper and similar materials adapted to contain sensibly dry food products and has for a general object the provision of simple receptacles having compartments adapted to keep sensibly dry edible food product ingredients separate and to allow them to be easily and efficiently intermixed at will.

A more specific object of the invention is the provision of such receptacles having a main compartment adapted to contain a sensibly dry food product in a fresh, non-hygroscopic state and an auxiliary compartment adapted to contain a sensibly dry flavoring material, the compartments being adapted to be readily joined so that the flavoring material may be readily and efficiently intermixed with the food product prior to consumption.

A further object of the invention is the provision of such a receptacle formed from a tubular paper bag body having one end lapped back upon the main body portion to form two separate compartments when secured in the folded position, means being provided to allow ready unlapping of the lapped-back end to cause the compartments to communicate.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is an extended plan view of a receptacle blank of the present invention;

Fig. 2 is a perspective view of the receptacle blank shown in Fig. 1, indicating the method of formation of the completed receptacle;

Fig. 3 is a view similar to Fig. 1 of a modified form of receptacle blank;

Fig. 4 is a view similar to Fig. 2 of the modified form of receptacle blank shown in Fig. 3; and Fig. 5 is a perspective view of a filled receptacle of the type depicted in Figs. 1 and 2.

Prior to the present invention it has been recognized that many sensibly dry food products have better keeping qualities when the desired flavoring material is kept disassociated therefrom during storing. For example, since salt is hygroscopic; potato chips, peanuts, pop-corn, etc., can be kept in a better state of preservation if they are packed and stored without salt, the latter being added thereto just prior to consumption.

To such end the present invention has been made which efficiently provides for separate packing of the dry food product and the flavoring material with ready and simple means for obtaining their intermixture when desired.

Referring to the drawing, 10 indicates a bag body, preferably of waxed paper, formed in any suitable manner, such as by folding over and pasting together the side edges to form a longitudinal seam 11 and by lapping back and pasting in position the end 12 to form a closed end. A pair of transverse fold lines 13 and 14 are provided for a purpose to be set forth below and a strip of material or tab 15 is preferably secured to the closed end 12.

The receptacle is thus provided with a main compartment adapted to contain the sensibly dry food product and an auxiliary compartment adapted to contain the sensibly dry flavoring material by lapping the end 12 back upon the body of the bag along the fold line 13. In the preferred form the resultant lapped-back portion 16 is relapped upon the bag body along the fold line 14 to form an additional lapped-back portion 17 to insure an efficient separation of the two compartments, the tab 15, when used, being folded up with the lapped-back portions 16 and 17 and of a length sufficient to extend beyond the lapped-back portions when folded and refolded upon the bag body. The lapped-back portions 16 and 17 are then secured in the folded position by any suitable means such as adhesive.

It is to be understood that although the preferred form described requires the placement of the flavoring material in the closed end of the bag prior to the formation of the auxiliary flavoring material compartment that it is within the contemplation of the invention to leave both ends of the bag body open until a lapped-back portion is formed thereon and then the flavoring material is placed in the resultant auxiliary compartment and the food product is placed in the main compartment whereupon both ends are closed.

In Fig. 3 is depicted a bag body 10 having a different type of closed end 12' provided with fold lines 13' and 14'. The tab 15' is secured to the closed end 12' preferably near the fold line 14' and is folded up with the portions 16' and 17' as in the first modification, the end of the tab 15' extending beyond the back-lapped portions to allow ready engagement thereof.

When the auxiliary compartment formed by the lapped back portion 16 or 17 has been closed with the flavoring material or salt 18 therein and the main compartment 19 has been filled with a sensibly dry food product such as potato chips 20 and closed at 21 as depicted in Fig. 5, the desired separation of the food product and the flavoring material is attained. The receptacle depicted in Fig. 5 is that shown in Figs. 1 and 2. It is obvious, however, that the receptacle depicted in Figs. 3 and 4 will provide a filled receptacle functioning and operable in a similar manner. The flavoring material may be readily released into the main compartment 19 by pulling upon the tab 15 when the receptacle is inverted to position the flavoring material compartment at the top. The pull upon the tab 15 separates the adjacent walls of the main compartment and the auxiliary compartment normally held together by adhesive and tends to unfold the lapped back portions. Gentle shaking from side to side will cause the flavoring material or salt to mix efficiently with the food product contained in the main compartment 18. It will thus be seen that the objects set forth above are efficiently attained.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A receptacle comprising a main bag portion adapted to contain a sensibly dry food product having a portion of one end lapped back upon a wall of said main bag portion and secured thereto to form an auxiliary compartment adapted to contain a sensibly dry flavoring material, and means interposed between said lapped-back portion and an adjacent wall of said main bag portion to provide for ready unlapping of said lapped-back portion so that said auxiliary compartment will communicate with said main bag portion to allow the flavoring material to intermix with the food product.

2. A receptacle comprising a tubular bag body closed at one end having a portion of the closed end lapped back upon the main body of the bag and a wall of said lapped-back portion secured to an adjacent wall of the main body of the bag to form a main compartment adapted to contain a sensibly dry food product and an auxiliary sensibly dry flavoring material containing compartment lying adjacent the main compartment with a separating fold between said compartments constituting one end of the receptacle, and means interposed between the adjacent walls of said compartments to provide for ready separation thereof and unlapping of said lapped-back portion so that said compartments will communicate and allow the flavoring material to intermix with the food product.

3. A receptacle comprising a tubular bag body closed at one end having a portion of the closed end lapped back upon the main body of the bag and a wall of said lapped-back portion secured by paste to an adjacent wall of the main body of the bag to form a main compartment adapted to contain a sensibly dry food product and an auxiliary sensibly dry flavoring material containing compartment lying adjacent the main compartment with a separating fold between said compartments constituting one end of the receptacle, and means interposed between said pasted walls to allow ready separation thereof so that said auxiliary compartment will communicate with said main compartment to allow the flavoring material to intermix with the food product.

4. A receptacle comprising a tubular bag body closed at one end having a portion of the closed end lapped and relapped back upon the main body of the bag and a wall of the relapped portion secured to an adjacent wall of the main body of the bag to form a main compartment adapted to contain a sensibly dry food product and an auxiliary sensibly dry flavoring material containing compartment lying adjacent the main compartment with a separating fold between said compartments constituting one end of the receptacle, and means interposed between the adjacent walls of said compartments to allow ready release and unlapping of the lapped-back and relapped portions so that said compartments will communicate.

5. A receptacle comprising a tubular bag body closed at one end having a portion of the closed end lapped and relapped back upon the main body of the bag and a wall of the relapped portion secured by paste to an adjacent wall of the main body of the bag to form a main compartment adapted to contain a sensibly dry food product and an auxiliary sensibly dry flavoring material containing compartment lying adjacent the main compartment with a separating fold between said compartments constituting one end of the receptacle, and a tab secured between said lapped-back portions and the main body of the bag and of a length sufficient to extend therebeyond to allow ready unlapping of the lapped-back and relapped portions so that said compartments will communicate.

6. A receptacle comprising a flattened tubular bag body closed at one end having a portion of the closed end lapped and relapped back upon the main body of the bag and a wall of the relapped portion secured by paste to an adjacent wall of the main body of the bag to form a main bag compartment adapted to contain a sensibly dry food product and a sensibly dry flavoring material containing compartment lying adjacent the main compartment with a separating fold between said compartments constituting one end of the receptacle, and a tab secured to the closed end of said bag body folded up with said lapped-back and relapped portions and extending therebeyond to allow ready separation of the adjacent walls of the relapped portion and the main bag compartment and ready unfolding of said lapped-back and relapped portions so that said flavoring material compartment will communicate with the main bag compartment.

7. A receptacle comprising a tubular bag body closed at one end in a manner to form a closed tapered portion, said tapered portion having a sensibly dry flavoring material therein normally isolated from the remainder of the bag body constituting a main compartment adapted to contain a sensibly dry food product by lapping and relapping said tapered end back upon the bag body and pasting it in position, and a tab secured to a face of the tapered portion and folded up with said lapped-back portions and extending therebeyond to allow ready separation of said lapped-back portions from the bag body and ready unfolding of said lapped-back portions so that flavoring material may be released into the main compartment.

ROBERT HAROLD TOWNSLEY.